US006941721B2

(12) United States Patent
Lind

(10) Patent No.: US 6,941,721 B2
(45) Date of Patent: Sep. 13, 2005

(54) FIXING ELEMENT FOR DOUBLE PANE INSULATING WINDOW

(75) Inventor: Stefan Lind, Birkenhoerdt (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/481,552

(22) PCT Filed: May 14, 2002

(86) PCT No.: PCT/EP02/05267

§ 371 (c)(1), (2), (4) Date: Dec. 19, 2003

(87) PCT Pub. No.: WO03/006774

PCT Pub. Date: Jan. 23, 2003

(65) Prior Publication Data

US 2005/0097840 A1 May 12, 2005

(30) Foreign Application Priority Data

Jun. 20, 2001 (DE) .................................... 201 10 192 U

(51) Int. Cl.$^{7}$ ............................ E06B 3/54; F16B 39/00; E04F 13/14; E04B 2/88

(52) U.S. Cl. ...................... 52/786.13; 52/235; 411/107; 411/82.1; 411/542

(58) Field of Search .............................. 52/235, 786.13; 411/82.1

(56) References Cited

U.S. PATENT DOCUMENTS

| | | | | | |
|---|---|---|---|---|---|
| 3,446,508 A | * | 5/1969 | Mayer | ........................ | 277/639 |
| 5,106,250 A | * | 4/1992 | Fischer et al. | .............. | 411/107 |
| 6,430,894 B1 | * | 8/2002 | Chae et al. | ................ | 52/786.1 |
| 6,632,056 B1 | * | 10/2003 | Lind | .......................... | 411/107 |
| 2003/0138307 A1 | * | 7/2003 | Lind | .......................... | 411/34 |

FOREIGN PATENT DOCUMENTS

| | | | | | |
|---|---|---|---|---|---|
| DE | 296 21 302 U | | 2/1997 | | |
| DE | 299 21 128 U | | 1/2000 | | |
| DE | 299 13 278 U | | 12/2000 | | |
| EP | 0 440 896 B1 | * | 11/1990 | ........... | F16B/13/10 |
| EP | 0 647 760 A2 | * | 8/1994 | ............. | E06B/3/54 |
| EP | 0 965 721 A | | 12/1999 | | |
| WO | 97 08416 A | | 3/1997 | | |
| WO | 01/88305 A1 | * | 11/2001 | ........... | E04F/13/14 |
| WO | 03/006774 A1 | * | 1/2003 | ............. | E06B/3/54 |

* cited by examiner

*Primary Examiner*—Robert Canfield
(74) *Attorney, Agent, or Firm*—Michael J. Striker

(57) ABSTRACT

The invention relates to a fixing element (10) for double pane insulating glass (42, 44), which is anchored by expansion of an expansible ring (16) in a drilled hole having a conical undercut in an outer glass pane (42) of the insulating glass (42, 44). The invention provides for the fixing element (10) to be sealed with two sealing rings (30, 40) on both sides of an inner glass pane (44) of the insulating glass (42, 44) and additionally for an injection opening (41) to be provided, through which a sealing compound, for example, silicone, can be introduced into a gap at the point at which the fixing element (10) passes through the inner glass pane (44) in order to provide an extra seal at the passage point. The fixing element (10) ensures a permanent seal of the passage point.

6 Claims, 2 Drawing Sheets

FIXING ELEMENT FOR DOUBLE PANE INSULATING WINDOW

The invention relates to a fixing element for double pane insulating glass. Double pane insulating glass consists of two glass panes, one outer and one inner glass pane, which are arranged spaced apart. The terms inner and outer glass pane have been chosen for the purposes of clear identification of the particular glass pane and their differentiation. The two glass panes are normally set in a frame, which holds the two glass panes spaced apart from one another. A space between the two glass panes is hermetically sealed.

Such a fixing element for double pane insulating glass is known from DE 299 13 278 U1. The known fixing element comprises a threaded shank, at the end of which is arranged an expander body in the form of an expander cone. The expander cone is integral with the threaded shank. Other expander body forms are also known, for example, a pyramid-shaped expander body. An expansible element, which is expandable by being pushed onto the expander body, is mounted on the threaded shank or the expander body. In the case of the known fixing element, the expansible element is in the form of a ring, which has an undulation when viewed from the side. Other forms of expansible elements are also possible. Furthermore, the known fixing element has, mounted on the threaded shank, a spacer sleeve, which has a radially protruding flange at its end remote from the expander body. The flange is provided with a circumferential, i.e. annular, sealing enlargement at its end facing the expander body. Adjoining the spacer sleeve, a nut is screwed onto the threaded bolt.

For anchoring in a drilled hole having an undercut in the outer glass pane, the known fixing element is pushed, with its expander body leading, through a coincident hole in the inner glass pane and the expander body is introduced with the expansible element into the drilled hole having the undercut in the outer glass pane. The spacer sleeve mounted on the threaded shank passes through the hole in the inner glass pane and rests on the expansible element. By screwing on and tightening the nut, the expansible element with the spacer sleeve is pushed onto the expander body and expanded, the expansible element engages behind the undercut of the drilled hole in the outer glass pane, and the fixing element is anchored by interlocking engagement in the drilled hole having the undercut in the outer glass pane. The annular sealing enlargement is located, forming a seal, on the side of the inner glass pane remote from the outer glass pane. The double pane insulating glass can be fixed at the fixing element anchored in the outer glass pane, several fixing elements normally being used to fix a double pane insulating glass unit.

A long-term reliable hermetic seal of the space between the two glass panes at the point at which the fixing element passes through the inner glass pane is problematical. If a leak occurs at this point, air is able to penetrate into the space between the two glass panes. Moisture contained in the air reduces the insulating effect of the insulating glass and may furthermore condense and collect on one of the two glass panes. Since the space between the glass panes is not accessible, such a deposit is impossible to remove and the double pane insulating glass acquires a milky, misted appearance and has to be replaced.

The invention is therefore based on the problem of proposing a fixing element having enhanced reliability against leakage at the point at which the fixing element passes through the inner glass pane.

That feature is solved according to the invention. The fixing element according to the invention has, surrounding the shank, a second, annular, sealing element, which, forming a seal, abuts the side of the inner glass pane facing the outer glass pane. The fixing element according to the invention therefore has on each side of the inner glass pane an annular sealing element surrounding the shank and sealing the shank with respect to the inner glass pane at the point at which it passes through the inner glass pane. Reliability against leakage is therefore increased, since, on failure of one sealing element, the other sealing element still forms a seal.

Furthermore, the fixing element according to the invention has an injection opening, which is accessible from the side of the inner glass pane remote from the outer glass pane. A sealing compound can be introduced through the injection opening into the bore in the inner glass pane, through which the shank of the fixing element passes. The sealing compound additionally seals the sealing element at the point at which it passes through the inner glass pane. This ensures a long-term reliable seal of the passage point. No seal is required on the outer glass pane, since the drilled hole having the undercut is not a through-bore but a blind bore.

One construction of the invention provides an element in the form of a pierced disc, which is arranged on the side of the inner glass pane remote from the outer glass pane. The pierced disc-form element has the one sealing element and the injection opening.

One construction of the invention provides a spacer sleeve, which is mounted on the shank of the fixing element and is located between the two glass panes and maintains the spacing between them. The spacer sleeve comprises the other sealing element abutting and forming a seal at the side of the inner glass pane facing the outer glass pane.

The sealing elements can be in the form, for example, of circumferential sealing enlargements, sealing lips or similar structures integral with the pierced disc-form element and spacer sleeve. One construction of the invention provides sealing rings as sealing elements, which are placed, for example, in annular grooves of the pierced disc-form element and the spacer sleeve.

The pierced disc-form element and/or the spacer sleeve are preferably mounted with a clamped and sealed fit on the shank of the fixing element.

In a preferred construction of the invention, the shank of the fixing element according to the invention has an internal or external thread for fixing.

The invention is explained in detail hereinafter with reference to an exemplary embodiment illustrated in the drawings, in which FIG. 1 shows, in axial section, a fixing element according to the invention anchored in double pane insulating glass;

Figure 1:
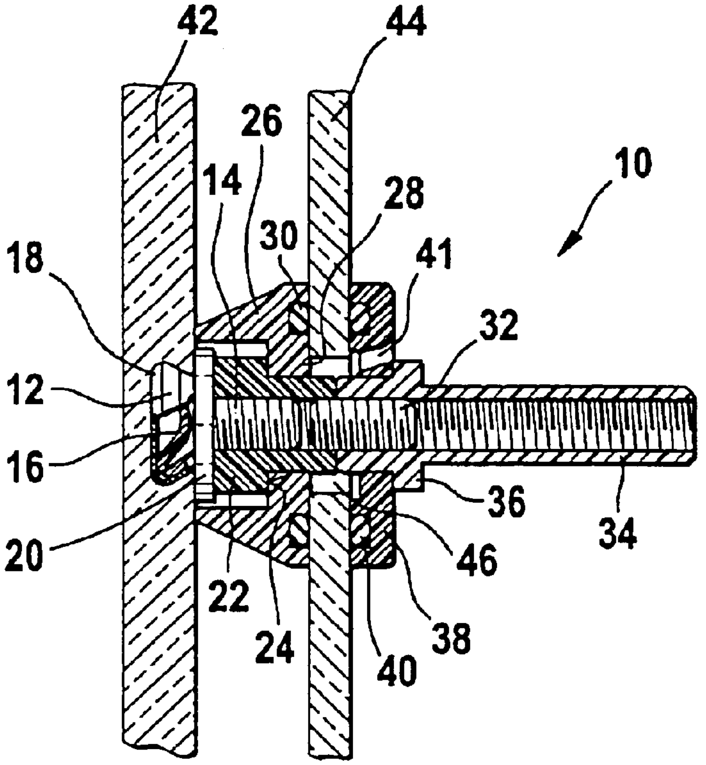

The fixing element 10 according to the invention shown in FIG. 1 comprises an expander cone 12 as expander body, which at its end of smaller diameter is in one piece with a threaded stem 14. An expansion ring 16, as expansible element, is mounted on the expander cone 12 and is expanded by being pushed onto the expander cone 12. The expansion ring 16 is of undulating form in side view. A protective cap 18 of plastics material is slipped over the expansion ring 16 and the expander cone 12.

Adjoining the expander cone 12, a plastics material washer 20 is placed on the threaded stem 14 and an internally threaded sleeve 22 is screwed on. The sleeve 22 has an annular shoulder 24 at its outer circumference. A truncated cone-shaped spacer sleeve 26 of plastics material is mounted on the sleeve 22, and, with an inwardly protruding collar 28, abuts the annular shoulder 24 of the sleeve 22 in clamped and sealed engagement against the circumference thereof. An end face of the spacer sleeve 26 remote from the expander cone 12 is provided with a circular groove, into which an O-ring is located as sealing ring 30.

Figure 2:
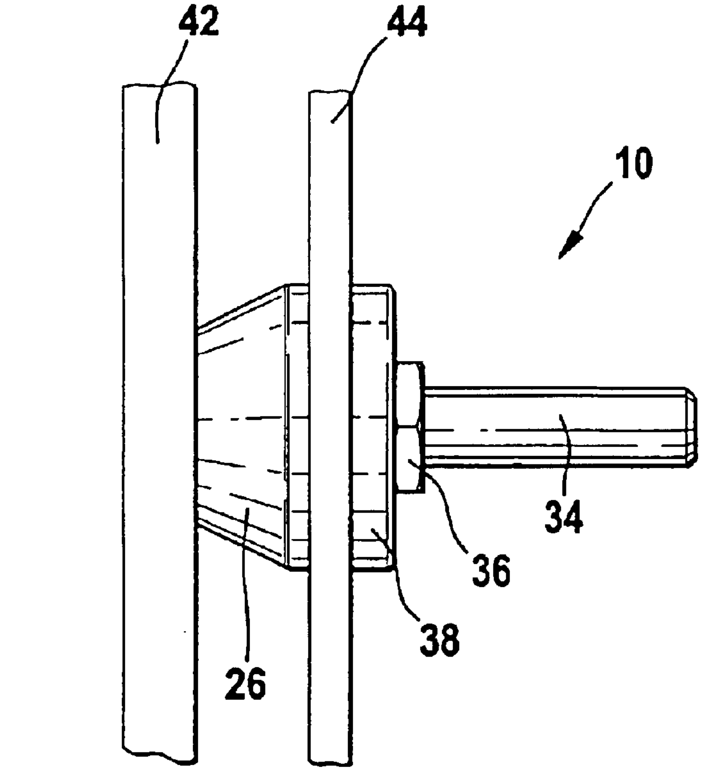
FIG. 2 shows, in a side view, the fixing element from FIG. 1.

The sleeve 22 is longer than the threaded stem 14, so that the internal thread of the sleeve 22 extends beyond it. A threaded bolt 32 is screwed into the overhanging part of the internal thread of the sleeve 22 to lie adjacent to the threaded stem 14, and projects out of the sleeve 22. An internally threaded tube 34, which has an integral, laterally protruding hexagonal collar 36 (cf. FIG. 2), is screwed onto the threaded bolt 32. The sleeve 22, the threaded stem 14, the threaded bolt 32 and the tube 34 form the shank 14, 22, 32, 34 of the fixing element 10.

A pierced disc-form element 38 is mounted on the tube 34 on the side of the hexagon collar 36 facing the spacer sleeve 26, the pierced disc-form element 38 engaging with a clamped, and hence sealed, fit on the tube 34. In the end face of the pierced disc-form element 38 facing the spacer sleeve 26 there is a circular groove, in which an O-ring is located as sealing ring 40. The pierced disc-form element 38 is provided with an injection opening 41, which passes through the pierced disc-form element 38 from one end face to the other end face within the sealing ring 40 and is accessible laterally of the hexagonal collar 36.

The fixing element 10 serves for fixing double pane insulating glass 42, 44, which comprises two glass panes 42, 44 arranged spaced from one another. The two glass panes 42, 44 are set in a frame, not visible in the drawings, which holds the two glass panes 42, 44 spaced apart from one another. The frame hermetically seals a space between the glass panes 42, 44. To distinguish between them, in the following description one of the two glass panes will be referred to as the outer glass pane 42 and the other as the inner glass pane 44. The outer glass pane 42 is provided with a drilled hole, which has a conically flared undercut. The inner glass pane 44 is provided with a continuous drilled hole 46, which has, at least approximately, the same axis as the drilled hole in the outer glass pane 42.

Figure 3:
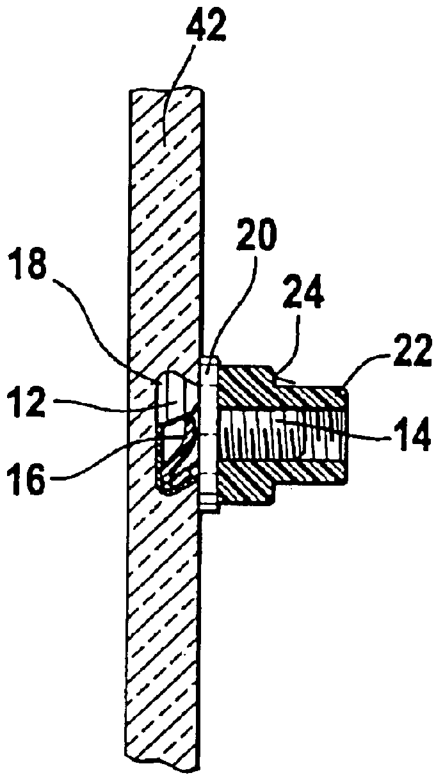
FIG. 3 shows a step in the mounting of the fixing element from FIG. 1.

For fixing, as illustrated in FIG. 3, first of all the threaded stem 14, with the expander cone 12, the expansion ring 16, which is in position but has not yet been expanded, and the protective cap 18 which has been slipped on, is inserted into the undercut drilled hole in the outer glass pane 42. The washer 20 is then put in position and the sleeve 22 is screwed onto the threaded stem 14. By tightening the sleeve 22, the expansion ring 16 is pushed onto the expander cone 12 and consequently expanded. The expanded expansion ring 16 engages behind the undercut of the drilled hole in the outer glass pane 42, so that the said parts of the fixing element 10 are anchored with an interlocking fit in the drilled hole in the outer glass pane 42. The protective cap 18 that has been slipped on prevents the glass pane 42 from being damaged.

The sleeve 22, the threaded stem 14, the threaded bolt 32 and the tube 34 form a shank 14, 22, 32, 34 of the fixing element 10.

Figure 4:
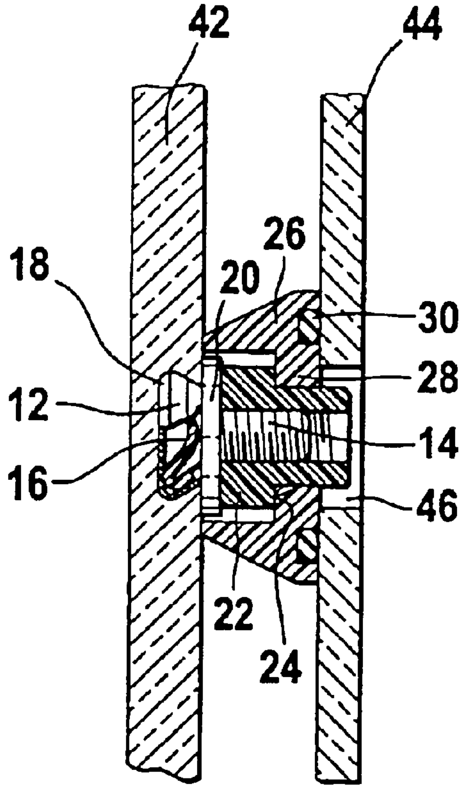
FIG. 4 shows a further step in the mounting of the fixing element from FIG. 1.

Next, the spacer sleeve 26 is placed on the sleeve 22 and then the inner glass pane 44 is arranged spaced from the outer glass pane 42, as illustrated in FIG. 4. In a manner known per se, the two glass panes 42, 44 are joined to one another and hermetically sealed by means of the frame, not visible in the drawing. The inner glass pane 44 abuts the end face of the spacer sleeve 26 facing it, the sealing ring 30 arranged there abuts the inner glass pane 44, forming a seal, and seals the space between the two glass panes 42, 44 with respect to the drilled hole 46 in the inner glass pane 44.

Subsequently, as illustrated in FIG. 1, the threaded bolt 32 is screwed into the internal thread of the sleeve 22, and the internally threaded tube 34, with the pierced disc-form element 38 mounted on the tube 34, is screwed onto the threaded bolt 32 and tightened. The pierced disc-form element 38 abuts the side of the inner glass pane 44 remote from the outer glass pane 42, and the sealing ring 40 placed in the pierced disc-form element 38 seals the drilled hole 46 in the inner glass pane 44 towards the outside, thus providing a second seal.

Subsequently, a sealing compound, for example silicone, is introduced through the injection opening 41, between the pierced disc-form element 38 and the spacer sleeve 26, into the drilled hole 46 in the inner glass pane 44. The injected sealing compound fills the gap completely and, in addition to the seal effected by the two sealing rings 30, 40, hermetically seals the fixing element 10 at the point at which it passes through the inner glass pane 44. A permanent seal at the point at which the fixing element 10 passes through the inner glass pane 44 of the double pane insulating glass 42, 44 is accordingly ensured.

The double pane insulating glass 42, 44 can now be fixed at the tube 34 of the fixing element 10, which is part of the shank 14, 22, 32, 34 of the fixing element 10, to, for example, a substructure. If an internal thread is required for fixing instead of an external thread, an axially shorter tube is used instead of the tube 34 and a longer threaded bolt is used instead of the threaded bolt 32, so that the threaded bolt 32 protrudes from the tube 34 and its external thread can be used for fixing.

I claim:

1. Fixing element for double pane insulating glass having an outer glass pane and an inner glass pane arranged spaced from the outer glass pane, having a shank with an expander body at one end, the expander body widening in the direction away from the shank, having an expansion element, which is expandable by pushing it onto the expander body in order to anchor the fixing element in a drilled hole having an undercut in the outer glass pane, and having an annular sealing element, surrounding the shank, for sealing the shank on the side of the inner glass pane remote from the outer glass pane at a point at which the shank passes through the inner glass pane, characterised in that the fixing element (10) comprises a second, annular, sealing element (30), surrounding the shank (14, 22, 32, 34), for sealing the shank (14, 22, 32, 34) on the side of the inner glass pane (44) facing the outer glass pane (42) at the point at which the shank (14, 22, 32, 34) passes through the inner glass pane (44), which sealing element is arranged axially in the direction of the expander body (12), offset with respect to a sealing element (40), and in that the fixing element (10) has an injection opening (41), which is accessible from the side of the inner glass pane (44) remote from the outer glass pane (42) and which opens out into a gap between the two sealing elements (30, 40) at the point at which the shank (14, 22, 32, 34) passes through the inner glass pane (44).

2. Fixing element according to claim 1, characterised in that the fixing element (10) has a pierced disc-form element (38) mounted on the shank (14, 22, 32, 34) and having the one sealing element (40) and the injection opening (41).

3. Fixing element according to claim 1, characterised in that the fixing element (10) has a spacer sleeve (26) mounted on the shank (14, 22, 32, 34) and having the other sealing element (30).

4. Fixing element according to claim 1, characterised in that the fixing element (10) has a sealing ring (30, 40) as sealing element.

5. Fixing element according to claim 1, characterised in that the expansion element is an expansible ring (16).

6. Fixing element according to claim 1, characterised in that the shank (14, 22, 32, 34) has a thread.

* * * * *